July 18, 1967         A. J. ADLER         3,331,958
PORTABLE FLUORESCENT LAMP
Filed May 4, 1964                         3 Sheets-Sheet 1

INVENTOR
Alan J. Adler
BY

July 18, 1967     A. J. ADLER     3,331,958
PORTABLE FLUORESCENT LAMP
Filed May 4, 1964     3 Sheets-Sheet 3

INVENTOR
Alan J. Adler
BY

United States Patent Office 3,331,958
Patented July 18, 1967

3,331,958
PORTABLE FLUORESCENT LAMP
Alan J. Adler, 886 River Road,
Teaneck, N.J. 07666
Filed May 4, 1964, Ser. No. 364,444
1 Claim. (Cl. 240—10.6)

The present invention is a portabe lamp containing a fluorescent tube as a source of illumination and containing four "D" size flashlight cells and a transistor oscillator to energize the fluorescent tube.

Previous portable fluorescent lamps have been patented (Pessina 2,641,685; Beck 2,413,599). These lamps had a number of disadvantages which limited their application:
A. They employed bulky, expensive, high voltage batteries as a source of electric power.
B. They operated on direct current and wasted electric power by using a resistor ballast to limit the current in the fluorescent tube.
C. They were of generally complex and bulky construction, taking up far more space than conventional incandescent flashlights.

The present invention is definitely revolutionary in design when compared to previous lamps:
A. It employs four standard "D" size flashlight cells as a source of electric power.
B. It converts the low voltage direct current from the four "D" size flashlight cells to high voltage alternating current by means of a transistor oscillator circuit. This permits current limiting with a highly efficient capacitor ballast and eliminates the power loss of a resistor ballast.
C. Its simple, streamlined, compact construction is designed to make it competitive in terms of cost and size with conventional incandescent flashlights while being far superior in terms of light output.

The object of the present invention is to provide a portable fluorescent lamp of entirely new electrical design in terms of its employment of four "D" size flashlight cells, a transistor oscillator for converting low voltage D.C. to high voltage A.C., and a capacitor ballast.

Another object of the present invention is to provide a portable fluorescent lamp of entirely new mechanical design in terms of its simple construction wherein the spring action of the resilient parts holds the entire assembly together.

Another object of the present invention is to provide a portable fluorescent lamp of entirely new mechanical design in terms of its streamlined construction wherein the batteries are arranged in a single longitudinal row behind and parallel to the fluorescent tube and reflector.

Figure 1:
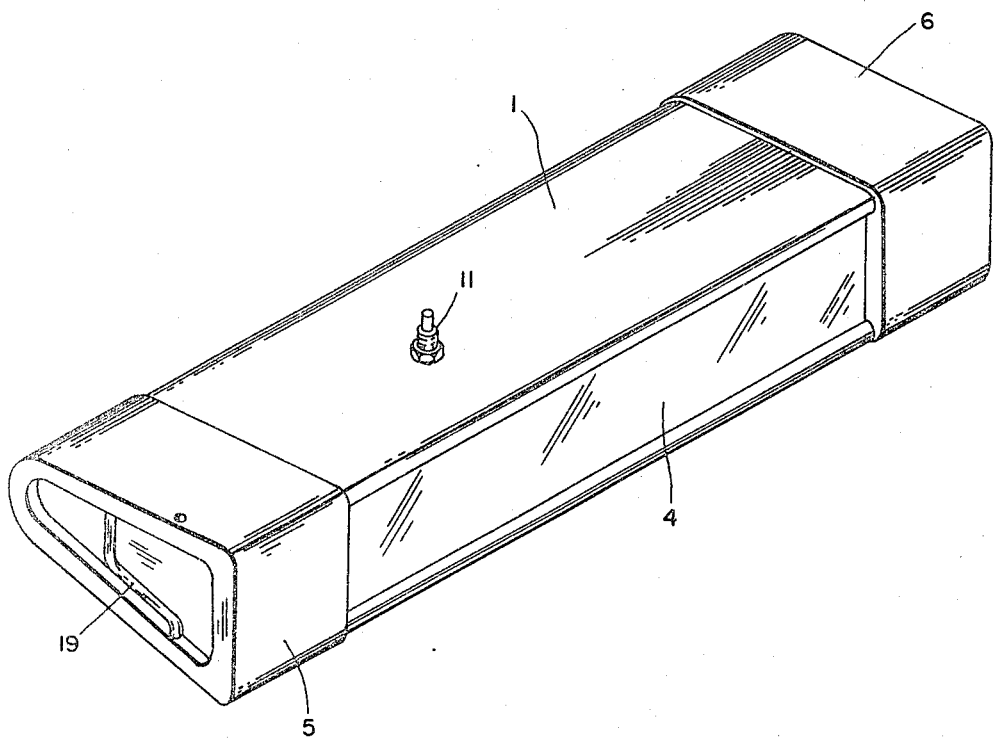
Figure 2:
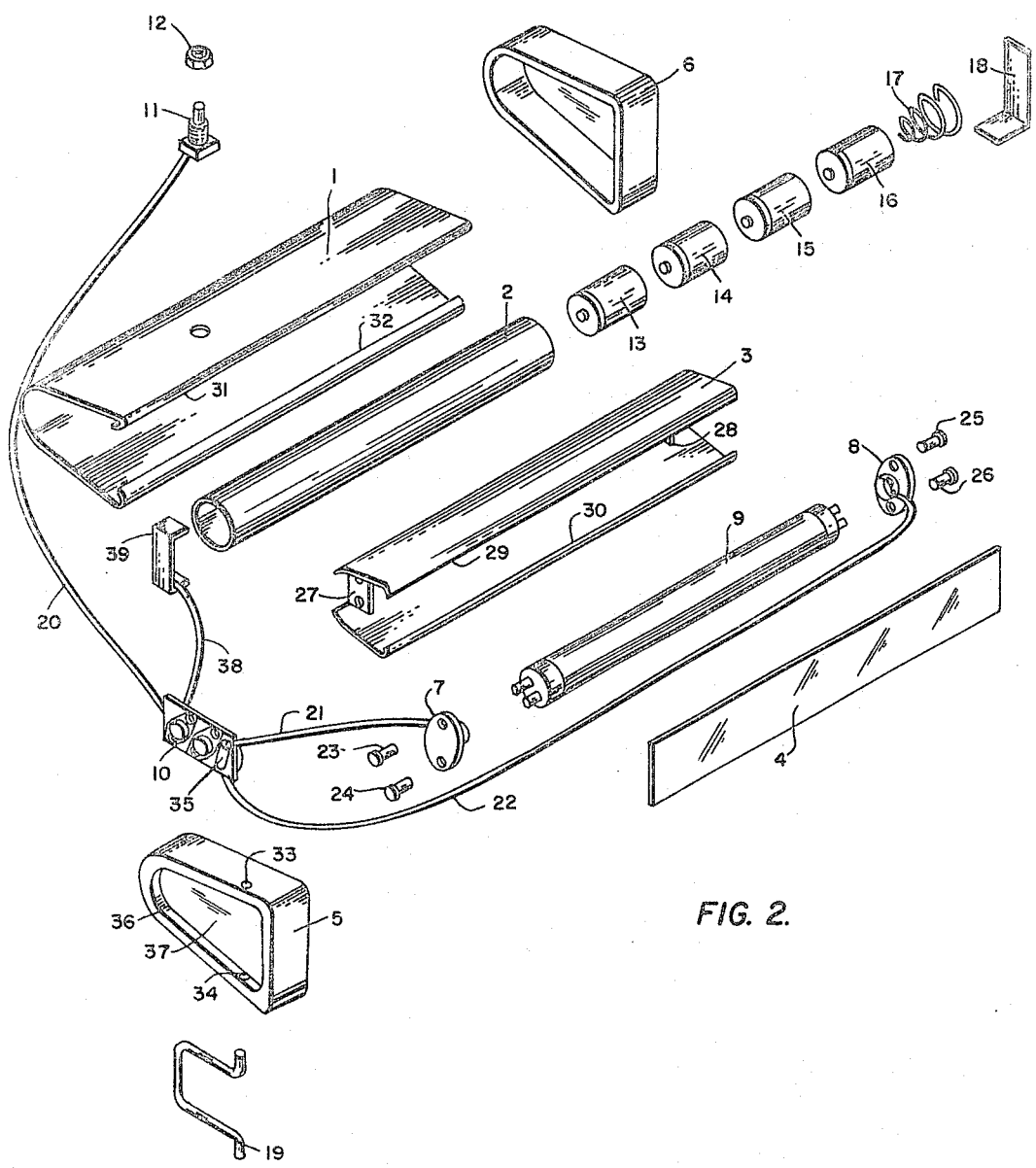
Figure 3:
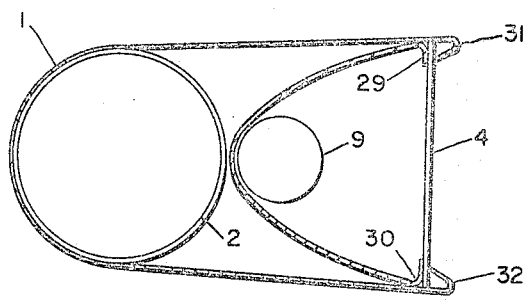
Figure 5:
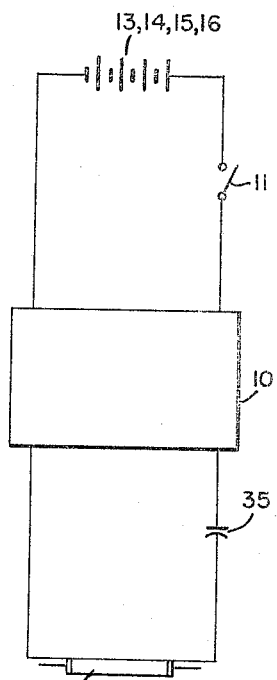
Figure 4:
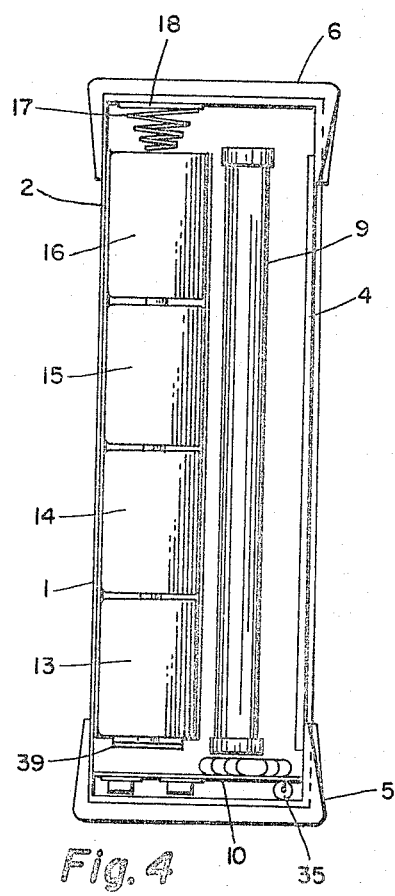

The following drawings illustrate the invention:
FIGURE 1 is an isometric view of the assembled lamp.
FIGURE 2 is an exploded view showing all parts referred to in the description.
FIGURE 3 is a perpendicular cross section taken through the middle of the lamp.
FIGURE 4 is a parallel cross section taken through the center of the lamp.
FIGURE 5 is a circuit diagram of the lamp.

The following is a description of the mechanical construction of the lamp:

Referring to FIGURE 2, the fluorescent tube 9 is retained by two standard plastic lampholders 7 and 8 which are riveted 23, 24, 25 and 26 to two tabs 27 and 28 which are part of the sheet metal reflector 3.

The four "D" size battery cells 13, 14, 15 and 16 are enclosed in a cardboard or plastic tube 2 which is directly behind the reflector 3. A transparent plastic window 4 is directly in front of the reflector 3. The front edges of the reflector 3 are bent to form lips 29 and 30 which press against the window 4.

Referring to FIGURE 3, a sheet metal housing 1 surrounds the battery tube 2 and the reflector 3 and window 4. The front edges of the housing are bent 31 and 32 to press against the window 4. The resiliency of the reflector 3, pressing back against the battery tube 2 and the housing 1 and pressing forward against the window 4 and the housing 1 serves to hold the assembly together.

Two resilient plastic end caps 5 and 6 press fitted over the ends of the housing 1 complete the assembly. One end cap is glued in place and has two holes 33 and 34 in its outer ridge 36 to receive a metal handle 19. The handle folds into a recess 37 on the outside of the cap 5. The end cap 5 also contains the transistor oscillator 10 which is fastened to the inside of the cap with pitch.

The other end cap 6 is removable to allow for battery or bulb replacement.

The electrical circuit is as follows: An SPST "on-off" switch 11 is mounted in the metal housing 1. One lead from the switch 11 is in electrical contact with the case. The other lead 20 from the switch 11 goes to the transistor oscillator 10 and is the negative 6 volt power input. The positive 6 volt input is via a wire 38 which is attached to a clip 39 which slips over the end of the battery tube 2 and makes contact with the positive terminal on the first "D" cell 13. The negative return for the last "D" cell is via a spring 17 and a metal clip 18 which makes contact with the housing 1. The high voltage leads 21 and 22 go to the lampholders 7 and 8 which complete the electrical circuit to the fluorescent tube 9.

No "starting" circuit is required for this lamp. When the switch 11 is turned on, the voltage output from the transistor oscillator 10 (which is limited in current by a capacitor ballast 35) is high enough to instantly start the lamp, even when the batteries have deteriorated to half voltage.

From the foregoing description it should be apparent that the present invention provides many features which are entirely new in a portable fluorescent lamp.

Obviously, the construction may be modified in some respects without departing from the spirit of the invention which is clearly spelled out in the claim.

What I claim is:
In a portable fluorescent lamp of compact and streamlined configuration; an elongated longitudinally extending housing of generally U-shaped cross section having an open top, a bottom wall and side walls provided with inwardly turned edges along such open top; an elongated longitudinally extending reflector of generally U-shaped cross section having an open top, a bottom wall and side walls; said reflector being resilient and equipped adjacent the ends thereof with sockets providing a mounting for a fluorescent tube and being disposed within said housing with the bottom walls thereof oriented in spaced-apart facing relation and defining therebetween an elongated longitudinally extending space for receiving therein a plurality of batteries oriented in aligned succession to form an elongated row; a plurality of batteries defining such an elongated row thereof positioned within said space; a fluorescent tube supported within said reflector by said sockets; an elongated longitudinally extending window extending along the open top of said reflector in engagement therewith and being confined thereby against the inwardly turned edges of said housing; a pair of end caps telescopically receiving therein the respectively associated end portions of said housing and reflector and at least one of said caps being removable to provide access to the interior of said lamp; and a circuit for said lamp including said batteries and fluorescent tube; said housing, batteries, reflector and window being integrated and held together by the resilience of said reflector which exerts an integrating spring force operative in directions toward said batteries and said window.

References Cited

UNITED STATES PATENTS

| | | | |
|---|---|---|---|
| 2,413,599 | 12/1946 | Beck | 240—10.65 |
| 2,435,164 | 1/1948 | Sobel | 240—10.65 |
| 2,440,842 | 5/1948 | Brooks | 240—10.65 |
| 2,641,685 | 6/1953 | Pessina | 240—10.65 |
| 2,668,229 | 2/1954 | Akroyd | 240—10.65 |
| 2,849,598 | 8/1958 | Lipscomb | 240—51.11 XR |
| 3,084,283 | 4/1963 | Crunwaldt | 331—11 XR |

FOREIGN PATENTS 1,063,421  12/1953  France.

NORTON ANSHER, *Primary Examiner.*

C. R. RHODES, C. B. PRICE, J. F. PETERS, JR.,
*Assistant Examiners.*